United States Patent
Wang et al.

(10) Patent No.: US 8,330,292 B2
(45) Date of Patent: Dec. 11, 2012

(54) POWER SUPPLY PROVIDING AN INTEGRATED POWER SYSTEM

(75) Inventors: Yi-Hua Wang, Taipei Hsien (TW); Yu-Yuan Chang, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 362 days.

(21) Appl. No.: 12/567,329

(22) Filed: Sep. 25, 2009

(65) Prior Publication Data

US 2011/0074212 A1    Mar. 31, 2011

(51) Int. Cl.
*G05D 23/00* (2006.01)
*G06F 1/00* (2006.01)
*H02J 1/00* (2006.01)

(52) U.S. Cl. .................. 307/38; 700/295; 713/324
(58) Field of Classification Search .................. 307/31; 700/295; 713/324, 300
See application file for complete search history.

(56) References Cited

U.S. PATENT DOCUMENTS
7,791,222 B2 * 9/2010 Jung .............................. 307/99

* cited by examiner

*Primary Examiner* — Michael Rutland Wallis
(74) *Attorney, Agent, or Firm* — Muncy, Geissler, Olds & Lowe, PLLC

(57) ABSTRACT

A power supply with an integrated power system has a common transformer. After the power supply receives input power, the common transformer generates an induction power at the secondary side. The power supply further includes a standby power system receiving the induction power and outputting a standby power, an actuation switch with one end electrically bridging the common transformer and the standby power system, a primary power system connecting to the other end of the actuation switch, and a power management unit receives the standby power to be activated. The standby power system modulates and transforms the induction power to the standby power to start operation of the power management unit. Users can trigger the power management unit to output an enabling signal to conduct the actuation switch to be ON so that the primary power system can receive the induction power and transform to output the primary output power.

8 Claims, 3 Drawing Sheets

POWER SUPPLY PROVIDING AN INTEGRATED POWER SYSTEM

FIELD OF THE INVENTION

The present invention relates to a power supply that provides an integrated power system and particularly to a circuitry to improve configurations of a primary power system and a standby power system that adopts Advanced Technology Extended (ATX) specifications.

BACKGROUND OF THE INVENTION

Most desktop computers nowadays use power supplies of ATX specifications. The power supply that adopts the ATX specifications has a main feature, i.e. including a primary power system and a standby power system. After the power supply has received commercial power, the standby power system automatically generates a standby power supplying to other systems (such as primary power system, protection system and control chip sets and the like) to enter standby conditions. When users start the power supply (usually at the same time of starting the computer, the start signal starting the power supply first), then the primary power system starts to transform the commercial power to primary power to supply other devices in the computer.

Refer to FIG. 1 for the fundamental circuit architecture of a conventional power supply. The power supply has a first rectification unit 2 to receive commercial power from a commercial power output end 1 and rectify the commercial power, a power factor correction unit 3 to modulate commercial power factor, a primary power system 4 and a standby power system 5 that respectively connect to the power factor correction unit 3. After receiving the power, the standby power system 5 which includes a first transformer 51, a first switch 52, a first pulse modulation unit 53 and a second rectification unit 54, generates a standby power 55. The primary power system 4 and a power management unit 6 receive the standby power 55 and enter a standby condition to be started by users. When an user provides a start signal 7 (PS_ON) to the power management unit 6, the power management unit 6 outputs an enabling signal 71 to a second pulse modulation unit 43 in the primary power system 4 to start operation, the primary power system 4 has a second transformer 41 and a second switch 42 under the control of the second pulse modulation unit 43 to transform power, and through a third rectification unit 44, a primary output power 45 at 12V is formed. The primary output power 45 of 12V also can be transformed through at least one conversion unit 46 to become other forms of primary output power 45 at 5V or 3.3V to be used by different devices. The conversion unit 46 may include a plurality of converters. The technique for the primary power system 4 to provide output power at multiple voltages is known in the art, details are omitted here.

As previously discussed, the primary power system 4 and standby power system 5 have different starting conditions and time series. In the conventional power supply, the primary power system 4 and standby power system 5 are separated and independent. Each has its own transformer and related control circuit to generate independent output power. Hence more circuit elements are needed to form the primary power system 4 and standby power system 5. As a result, it is difficult to shrink the size and lower the cost.

SUMMARY OF THE INVENTION

In view of the conventional technique that separates the primary power system and standby power system into independent systems and results in a higher cost and greater volume, the primary object of the present invention is to overcome these problems.

The present invention provides a power supply with an integrated power system. The power supply has a common transformer. After the power supply has received input power, current passes through the primary side of the common transformer, and the secondary side thereof generates an induction power. The power supply further has a standby power system electrically connected to the common transformer to receive the induction power and generate a standby power, an actuation switch with one end electrically bridging the common transformer and the standby power system, a primary power system connecting to the other end of the actuation switch and a power management unit electrically connected to the standby power system to receive the standby power to be started. The standby power system modulates and transforms the induction power to the standby power to start operation of the power management unit. Users can trigger the power management unit to output an enabling signal to conduct the actuation switch to be ON so that the primary power system can receive the induction power and transform to output the primary power.

The technique set forth above provides the common transformer to meet requirements of the primary power system and standby power system. Through the actuation switch, the primary power system and standby power system are parallel connected to the common transformer. ON/OFF of the primary power system is determined by conduction of the actuation switch. Thus operation of the primary power system and standby power system conforms to the ATX power supply specifications. The sizes and costs of the primary power system and standby power system can be reduced.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
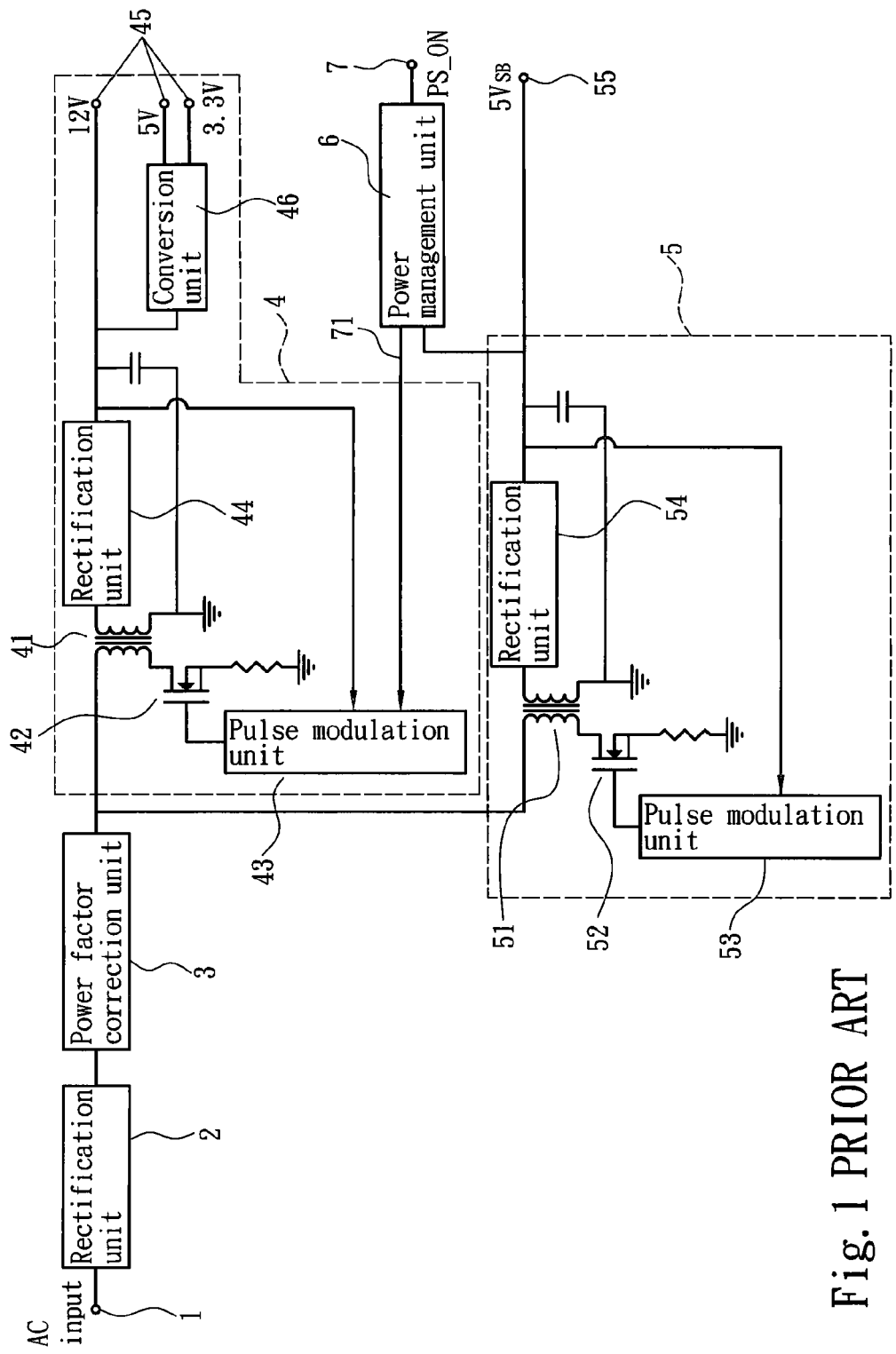
FIG. 1 is a schematic view of the circuit architecture of a conventional power supply.
Figure 2:
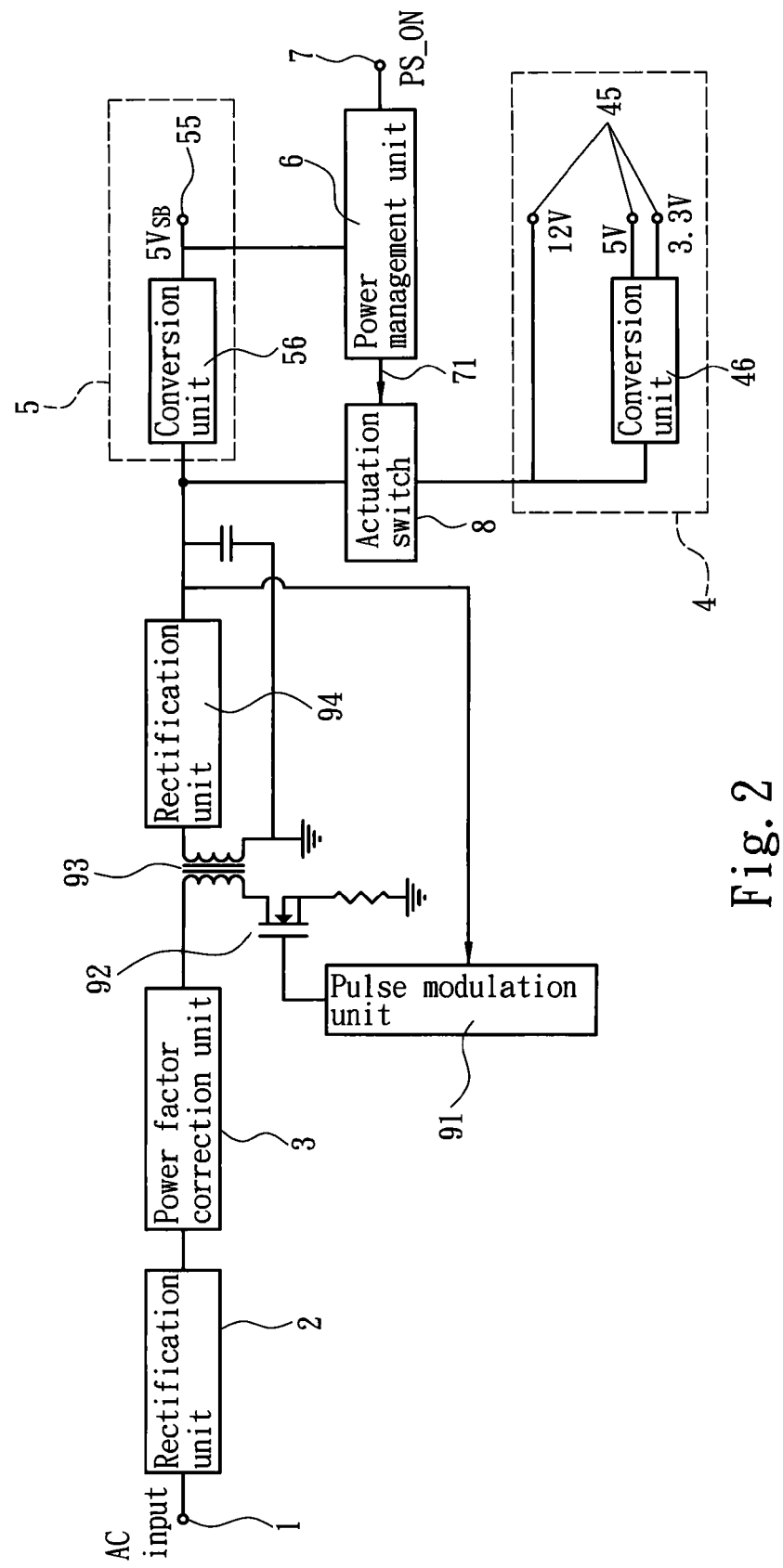
FIG. 2 is a schematic view of the circuit architecture of the invention.

The present invention aims to provide a power supply with an integrated power system. Please refer to FIG. 2 for the circuit architecture of the power supply. The power supply has a commercial power input end 1 to receive AC power, a first rectification unit 2 to receive the power from the commercial power input end 1 and rectify the power to become fluctuated DC power, and a power factor correction unit 3 to modulate power factor and voltage and output a DC modulated power. Operation of the power factor correction unit 3 are known in the art, thus details are omitted here. The power factor correction unit 3 is connected to the primary side of a common transformer 93 and the primary side of a common transformer 93 also is connected to a switch 92. ON/OFF of the switch 92 is controlled by a pulse modulation unit 91. The pulse modulation unit 91, by changing the duty ratio that drives the switch 92, controls time series of the current of the modulated power passing through the primary side of the common transformer 93, thereby generates an induction power at the secondary side of the common transformer 93. By controlling the duty ratio of the switch 92, the power of the induction power can be changed.

By means of the operation previously discussed, the common transformer 93 generates the induction power at the secondary side. The invention further has a standby power system 5 which is electrically connected to the common transformer 93 to receive the induction power. The standby power system 5 has a first conversion unit 56 to modulate the voltage of the induction power and provide a standby power 55 with a stable voltage. An actuation switch 8 also has one end bridging electrically the common transformer 93 and the standby power system 5 and the other end connecting to the primary power system 4 to determine whether it can receive the induction power through ON/OFF of the actuation switch 8. The actuation switch 8 is treated as a broken circuit when it is in the OFF condition. In that condition the induction power is used solely by the standby power system 5. The standby power system 5 outputs the standby power 55 to make the power supply to enter a standby condition. A power management unit 6 is electrically connected to the standby power system 5 to receive the standby power and is started to a standby condition. Users can generate an actuation signal 7 (PS_ON) to trigger the power management unit 6 to output an enabling signal 71 to conduct the actuation switch 8 to be ON, then the primary power system 4 can receive the induction power and transform and output at least one primary output power 45. Depending on power supply specification requirements, the primary power system 4 may have a second conversion unit 46 containing multiple converters to transform and output the primary output power 45 at multiple different potentials (such as 12V, 5V and 3.3V). Aside from the basic architecture previously discussed, the common transformer 93 and the standby power system 5 and actuation switch 8 can be bridged by a second rectification unit 94 to rectify the induction power to DC power. A feedback signal can be captured among the common transformer 93 and standby power system 5 and the actuation switch 8 to be sent to the pulse modulation unit 91 to perform feedback control.

As the standby power system 5 directly receives the induction power, and the actuation switch 8 controls power transmission path between the primary power system 4 and the common transformer 93, by incorporating the control of the power management unit 6, operations of the primary power system 4 and the standby power system 5 can conform to the ATX specifications. Through the common transformer 93, power required by the primary power system 4 and the standby power system 5 can be supplied at the same time. Thus the conventional problems of independent power systems that require individual transformers and result in higher cost and greater size can be resolved. Moreover, the common transformer 93 requires only one set of switch 92, one pulse modulation unit 91 and one rectification unit 94, and also one feedback circuit connecting to the pulse modulation unit 91. Total circuitry and the number of elements can be reduced. Thus the cost is lower and the volume is smaller.

Figure 3:
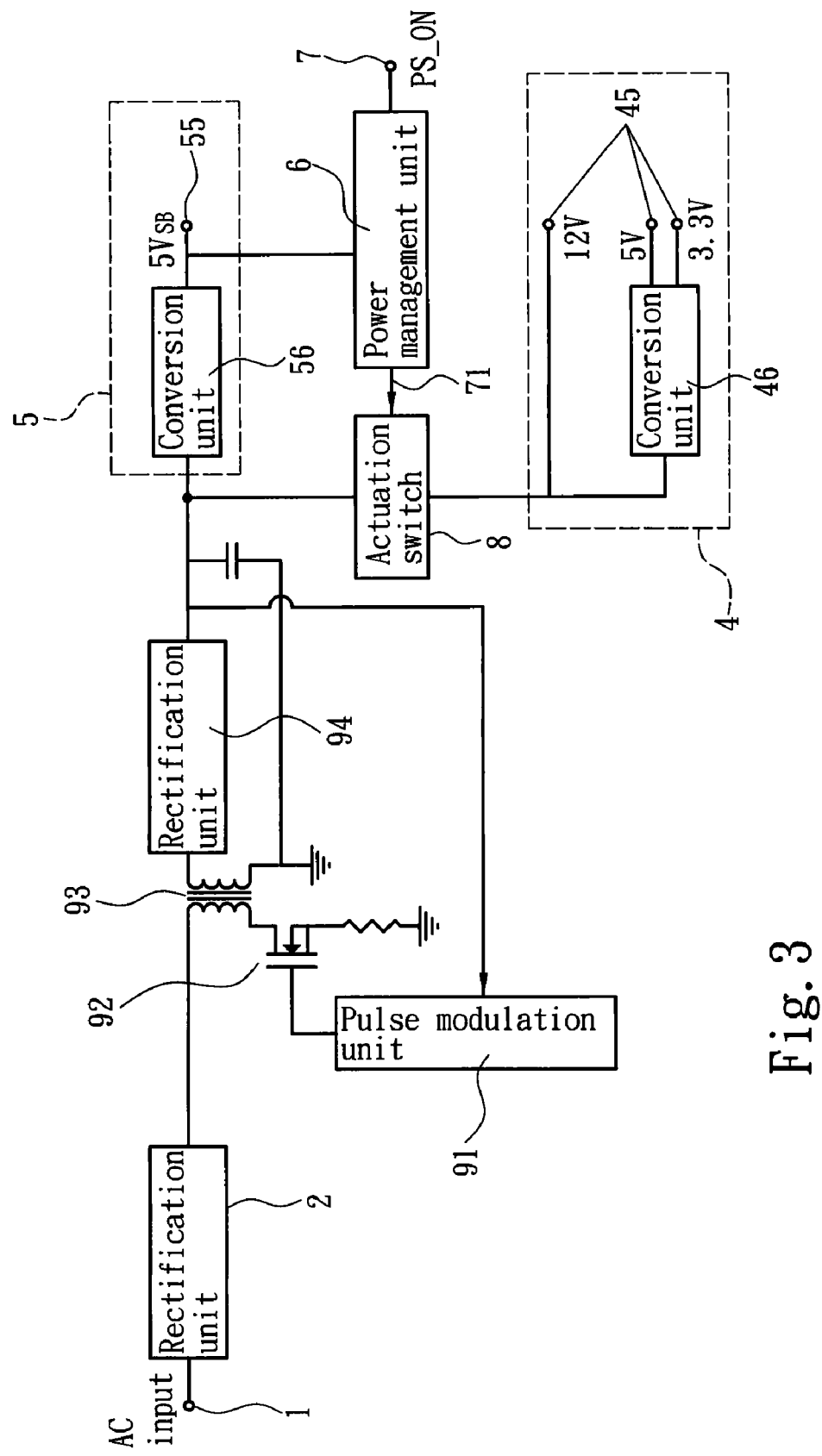
FIG. 3 is a schematic view of the circuit architecture of another embodiment of the invention.

Refer to FIG. 3 for another embodiment of the invention based on the technical features previously discussed, with some alterations made according to power supply specifications. The power supply also has the commercial power input end 1 to receive the AC power. The AC power passes through the first rectification unit 2 and is transformed to pulsed DC power. The pulse modulation unit 91 and switch 92 determine the period of the current passing through the common transformer 93. The induction power generated at the secondary side of the common transformer 93 passes through the second rectification unit 94. The standby power system 5 is directly connected to a rear end of the second rectification unit 94 to receive the power, and outputs the standby power 55 through the first conversion unit 56. The actuation switch 8 has one end electrically bridging the common transformer 93 and the standby power system 5 and the other end connecting to the primary power system 4. The power management system 6 outputs the enabling signal 71 to conduct the actuation switch 8 to be ON to allow the primary power system 4 to receive the power and output directly, or transform through the second conversion unit 46 to output the primary output power 45. The embodiment shown in FIG. 3 differs from the one shown in FIG. 2 by omitting the power factor correction unit 3. In a lower rate power or small scale power supply, the power factor correction unit 3 is optional in the circuitry architecture. Absence of the power factor correction unit 3 does not affect the operation of the primary power system 4 and standby power system 5, nor the ON/OFF of the actuation switch 8.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power supply providing an integrated power system and receiving an input power, comprising a common transformer which has a primary side a current passing through and a secondary side to generate an induction power, the power supply further including:
   a standby power system which is electrically connected to the common transformer to receive the induction power and modulate the induction power to a standby power;
   an actuation switch which has one end connected to a common point between the common transformer and the standby power system and the other end connecting to a primary power system, the actuation switch being conducted between ON and OFF to determine whether the primary power system receives the induction power; and
   a power management unit which is electrically connected to the standby power system and activated by receiving the standby power and triggered by users to output an enabling signal to conduct the actuation switch to be ON so that the primary power system receives the induction power and transforms and outputs at least one primary output power.

2. The power supply of claim 1, wherein the standby power system has at least one conversion unit to modulate the voltage of the induction power and output the standby power.

3. The power supply of claim 1, wherein the primary power system outputs the primary output power at multiple different potentials.

4. The power supply of claim 1, wherein the primary power system has a conversion unit including multiple converters, and each converter receives the induction power and outputs the primary output power at different potentials.

5. The power supply of claim 1, wherein the amount of power of the induction power at the secondary side of the common transformer is controlled by a switch and a pulse modulation unit driving the switch.

6. The power supply of claim 5, wherein the pulse modulation unit receives a feedback signal among the common transformer and the standby power system and the actuation switch to perform feedback control.

7. The power supply of claim 1, wherein the common transformer and the standby power system and the actuation switch are bridged by a rectification unit connecting to the common transformer.

8. The power supply of claim 1, wherein the primary side of the common transformer is electrically connected to a power factor correction unit which modulates the input power and generates a modulated power output passing through the primary side of the common transformer.

* * * * *